United States Patent [19]

Weiss et al.

[11] 4,028,550

[45] June 7, 1977

[54] X-RAY SCREENS

[75] Inventors: James Paul Weiss, Westfield, N.J.;
Edward Dyal Smith, Towanda, Pa.

[73] Assignee: E. I. Du Pont de Nemours and Company, Wilmington, Del.

[22] Filed: Dec. 22, 1975

[21] Appl. No.: 642,714

[52] U.S. Cl. .................. 250/483; 96/82; 252/301.33; 250/486; 427/157

[51] Int. Cl.² .................. H01J 1/62; C09K 11/12

[58] Field of Search .......... 252/301.32, 301.33, 252/301.36; 250/483, 486, 487, 488; 96/82; 427/157

[56] References Cited

UNITED STATES PATENTS

| | | | |
|---|---|---|---|
| 2,776,909 | 1/1957 | Fleck | 117/33.5 |
| 3,043,710 | 7/1962 | Patten | 117/33.5 |
| 3,300,310 | 1/1967 | Kennard et al. | 96/82 |
| 3,300,311 | 1/1967 | Kennard et al. | 96/82 |
| 3,676,436 | 7/1972 | Rao et al. | 260/343.2 R |
| 3,787,238 | 1/1974 | Juliano | 252/301.36 X |
| 3,895,157 | 7/1975 | Brixner et al. | 428/220 |
| 3,925,674 | 12/1975 | D'Silva et al. | 250/483 |
| 3,936,644 | 2/1976 | Rabatin | 250/486 |

FOREIGN PATENTS OR APPLICATIONS 999,789   7/1965   United Kingdom

*Primary Examiner*—John H. Mack
*Assistant Examiner*—Aaron Weisstuch

[57] ABSTRACT

X-ray screens having reduced mottle and exhibiting improved image quality are prepared using europium-activated fluorohalide phosphors having an aminocoumarin brightening agent added thereto.

12 Claims, 1 Drawing Figure

X-RAY SCREENS

BACKGROUND OF THE INVENTION

It is known in the art of luminescent screens used in radiographic applications and the like that the speed of such screens can be increased by addition of aminocoumarin brightening agents to conventional X-ray phosphors. It is also known that high speed screens can be prepared using a group of highly efficient X-ray phosphor compositions of the type $Ba_{1-(x+y)} Eu_x Sr_y FCl$ wherein Ba is responsible for the X-ray absorption and Eu is responsible for ultraviolet emission. Luminescent screens prepared from these phosphors exhibit increased stopping power accompanied by an unusual degree of actinic efficiency provided by the Eu activator. These screens also exhibit remarkable speed and conversion efficiency.

High actinic and conversion efficiency lead, however, to an undesirable effect known as quantum mottle. Cleare et al. in *The Am. J. of Roent. and Rad. Physics*, Vol. 88, No. 1, pp. 168–174 (July 1962) discuss the effect of quantum and screen structure mottle and suggest that quantum mottle may be minimized by lowering the effective conversion efficiency of the screen and the screen speed.

There is need for an X-ray screen in which mottle can be reduced at minimal sacrifice of screen speed.

SUMMARY OF THE INVENTION

This invention provides fluoroscopic and X-ray intensifying screens which employ europium-activated barium fluorohalide phosphors to which is added an aminocoumarin brightening agent, mixed in a suitable binder. The result is a screen having reduced mottle and only slightly reduced speed.

Since the prior art teaches that the addition of optical brighteners such as the aminocoumarins to conventional X-ray intensifying screens serves to increase the output of the screen and hence its speed, it is completely surprising that the effect noted with the screens of this invention would be just the opposite.

DESCRIPTION OF THE DRAWING

Referring now to the drawing.

DETAILED DESCRIPTION OF THE INVENTION

Figure 1:
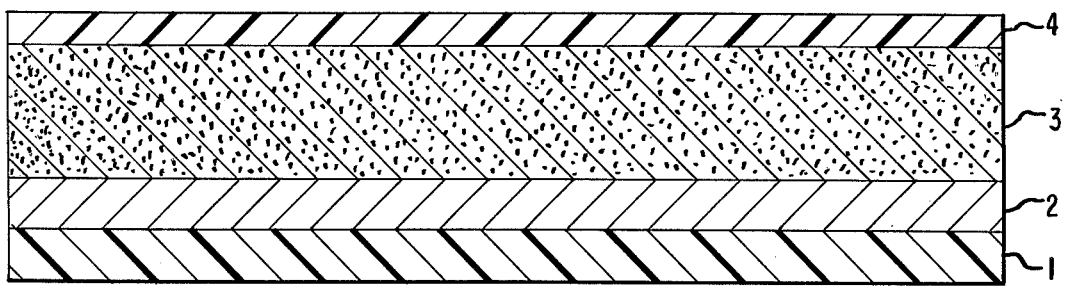
FIG. 1 shows a cross-section of an X-ray screen prepared from the luminescent composition of this invention wherein 1 is a support, 2 is an adhesive reflective layer, 3 is the phosphor layer, and 4 is a protective top-coat.

This invention is an improvement in fluorescent screens, and is particularly directed to X-ray screens that have been specially formulated to control the light output such that mottle is significantly reduced in the radiograhic image produced therefrom.

Referring to FIG. 1, the aminocoumarin brightening agents employed in this invention are incorporated in phosphor layer 3. No particular advantage is noted when they are added to layers 2 and 4.

Various aminocoumarin brightening agents useful in accordance with this invention can be illustrated by the following general formula:

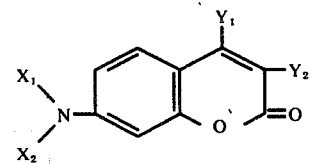

wherein each of $X_1$, $X_2$, $Y_1$, and $Y_2$ are hydrogen or alkyl. Typical examples are 7-monoethylamino-4-methylcoumarin, 7-dimethylamino-4-methylcoumarin, 7-diethylamino-4-methylcoumarin, 7-diethylamino-3,4-dimethylcoumarin, 3-allyl-4-methyl-7-diethylaminocoumarin, and the 7-triazinylamino-3-phenyl coumarins disclosed in Belgian Pat. No. 568,114.

A particularly useful group of aminocoumarin derivatives is obtained by reacting aminocoumarins with cyanuric chloride, optionally in the presence of another amine compound. Another particularly useful brightening agent is that formed from the reaction of 3-phenyl-7-aminocoumarin and diethylamine in the presence of cyanuric chloride as taught by Hauserman in U.S. Pat. No. 2,945,033; this is preferably added to the phosphor layer at about 0.01% by weight based on the phosphor present.

The luminescent phosphors of this invention are based on the formula $Ba_{1-(x+y)} Eu_x Sr_y FQ$ wherein Q is Br, Cl, or I, $x$ is 0.0001 to 0.2 and $y$ is 0 to 0.8 (molar amounts). A particularly useful phosphor within this formula is $Ba_{.98}Eu_{.02} FCl$.

In order to suppress afterglow or "lag" a certain amount of potassium or rubidium may also be added to the luminescent composition. Lag is continued phosphor emission after excitation has been discontinued. In medical X-ray applications it cannot be tolerated. Lag can be suppressed in the luminescent compositions described herein by adding a potassium or rubidium salt to the composition during phosphor preparation. In this instance, for example, lag will be fully suppressed if 0.1 weight percent of KCl is added to the aforesaid phosphor composition.

Where the aminocoumarins described above are mixed in the layer 3 of a screen based on this highly efficient and useful class of phosphors, a startling effect is noted. The light output is diminished slightly, and mottle is reduced such that a substantial improvement in image quality is noted in photographic elements normally employed with these screens. This fact is completely surprising, since the prior art teaches that these aminocoumarin compounds are optical brighteners and hence should increase the light output of the phosphor, resulting in decreased image quality due to quantum mottle and the like.

The support 1 can be paper or a metal foil, e.g. aluminum, but is preferably composed of macromolecular, hydrophobic organic polymer. Suitable polymeric supports include cellulose derivatives, e.g., cellulose acetate, cellulose propionate, cellulose acetate butyrate, ethyl cellulose; polyethylene, polyvinyl chloride, poly(-vinyl chloride co vinyl acetate); vinylidene chloride, vinyl acetate, acrylonitrile, styrene and isobutylene; polystyrene and polyesters, e.g. polyethylene terephthalates and homologous polyesters obtainable by the process described in Whinfield et al. U.S. Pat. No. 2,465,319. Polyethylene terephthalate films are particularly useful because of their dimensional stability. A particularly useful support is biaxially oriented polyethylene terephthalate coated with a subbing layer of vinylidene chloride-methylacrylate-itaconic acid copolymer as described in Alles et al. U.S. Pat. No. 2,779,684. The thickness of the support may be anywhere from about 0.0025 in. to 0.03 in. (0.0064 cm. to 0.0762 cm.) with 0.01 in. (0.0254 cm.) being preferred.

The support, moreover, may contain or be coated with dyes or finely divided pigments, e.g. titanium oxide, lithopone, magnesium carbonate, aluminum oxide, carbon black and colored pigments, e.g. tartrazine (C.I. No. 640), Victoria Green W.B. Base (C.I. No. 800) and Nubian Resin Black (C.I. No. 864), as opacifying or light-absorbing agents. The above mentioned dyes and pigments are particularly useful in reflective layers to vary the light output or block unwanted wavelengths. In addition, the base support may be metallized to provide reflective action, e.g. the polyethylene terephthalate base can be coated with a thin layer of aluminum, etc.

The reflective layer 2 may be composed of any of the well-known reflective agents or pigments dispersed in a suitable binder. Pigments such as $TiO_2$ are already known and widely used. Useful also are the potassium titanate reflective layers described in Brixner et al., U.S. Pat. No. 3,895,157 which also teaches the preparation of, for example, $K_2O(TiO_2)_6$. Preferably, the reflective layer of this invention includes equal amounts of $TiO_2$ and $K_2O(TiO_2)_6$ mixed in a binder. A suitable and preferred binder and method of reflective layer preparation is taught in Ex. 1 of Brixner et al. The reflective layer can be coated on the support at a thickness of about 0.0003 in. to about 0.001 in. (0.0007 cm. to 0.00254 cm.) or more.

The phosphor is usually prepared by mixing the desired phosphor in a suitable binder. The aminocoumarins are preferably added at this step so that they can be intimately mixed with the phosphor particles. This mixture is then coated over reflective layer 2 described above, or alternately, simply coated on support 1.

The phosphor layer may be from about 0.001 in. to 0.02 in. (0.0025 cm. to 0.051 cm.) thick and preferably of about 0.004 in. (0.0102 cm.) to 0.014 in. (0.036 cm.) thick when dry. The ratio of binder to phosphor may vary as desired. The aminocoumarins of this invention may be added to this layer in an amount between 0.001 to 1.0% based on the weight of the phosphor, preferably in the range of 0.01 to 0.1%.

Protective top coat 4 made according to any of the teachings of the prior art may be applied over the phosphor layer. These top coats can be cellulose nitrate or acetate or a mixture of resins comprising poly(methylmethacrylate), poly(isobutyl methacrylate) and vinyl chloride/vinyl acetate copolymers as taught by Patten, U.S. Pat. No. 2,907,882. A top coat similar to that described in Brixner et al. in U.S. Pat. No. 3,895,157 is particularly efficacious. The top coat layer can be from about 0.0001 in. to 0.005 in. (0.0003 cm. to 0.013 cm.) in thickness.

This invention will now be illustrated by the following examples:

EXAMPLE 1

An X-ray screen was prepared from the following:

EXAMPLE 1

An X-ray screen was prepared from the following:

| Phosphor Composition: | Parts by Weight |
|---|---|
| Phosphor ($Ba_{.9}Eu_{.05}Sr_{.05}FCl$) | 73.05 |

EXAMPLE 1-continued

An X-ray screen was prepared from the following:

| Phosphor Composition: | Parts by Weight |
|---|---|
| Binder Material (Brixner et al., U.S. 3,895,157, Ex. 1) | 5.52 |
| n-propanol | 1.91 |
| n-butyl acetate | 19.52 |

The above ingredients were ball milled for about 16 hours and filtered through a 200 mesh stainless screen. An optical brightening agent formed by reacting 3-phenyl-7-aminocoumarin and diethylamine in the presence of cyanuric chloride was added at a level of 0.16 weight percent based on the phosphor present in the above mixture.

A reflective suspension was prepared by sand-milling equal amounts of $TiO_2$ and $K_2O(TiO_2)_6$ in the binder solution described in Example 1 of Brixner et al., U.S. Pat. No. 3,895,157. The preparation of $K_2O(TiO_2)_6$ and the procedures for making reflective coatings similar to the one described here are taught in this reference. The milled suspension was then filtered and coated on the subbed side of a 0.01 in. (0.0254 cm.) thick sheet of biaxially oriented polyethylene terephthalate film with said sub layer comprising vinylidene chloride-methacrylate-itaconic acid copolymer prepared as described in Alles et al., U.S. Pat. No. 2,698,240. A reflective layer having a dried thickness of about 0.0011 in. (0.0028 cm.) was thus achieved.

The phosphor composition was coated on top of the reflective layer to a wet thickness of about 0.035 in. (0.089 cm.). A protective super coat having a dried thickness of about 0.0006 in. (0.0015 cm.) prepared according to the teachings of the above referenced Brixner et al. patent was then coated on top of the phosphor layer. Thus, an X-ray screen element similar to that of FIG. 1 was prepared. For control purposes, a screen without the optical brightener in the phosphor layer was also prepared.

These screens were then evaluated by exposure to an X-ray source at 80 kVp and 10 ma filtered through 1½ mm of aluminum and ½ mm copper foils. Exposure was made with two samples of each screen in contact with each side of a high speed, double-side coated, gelatino-silver halide medical X-ray film element. The film and screens were placed in a vacuum cassette to insure optimum film-screen contact and placed at a distance of about 55 in. (139.7 cm.) from the X-ray source and given a 1/10 second exposure at the above conditions. Small sheets of copper foil (approximately 0.075 mm thick) were placed in the beam until film samples having gross densities of 0.5 to 1.5 were obtained. The individual film samples had essentially uniform exposure except for the random exposure fluctuations called "mottle". The exposed films were then conventionally processed and analyzed for mottle on a granulometer following the procedure and using an instrument similar to that described by Altman in *Applied Optics*, Vol. 3, No. 1, pp. 35–38, January 1964. For each density achieved by exposure, a root-mean-square (rms) granularity measurement was made through a 300 μm circular aperture and a plot of rms granularity vs. density (D) was made. Samples of film were also exposed with these screens through an aluminum step wedge to get sensitometric measurements (e.g., speed). The following results were obtained:

| Sample | Brightening Agent (Wt. % of Phosphor Layer) | Relative Screen Speed | Mottle[1] (rms granularity at D = 1.00) |
|---|---|---|---|
| A-Control | None | 100 | 0.028 |
| B | 0.16 | 74.8 | 0.019 |

[1]The lower the number, the lower the mottle.

This example demonstrates a dramatic reduction in mottle, much more than would be expected from the speed decrease. According to the teachings of Cleare et al. supra, the 25% speed reduction should result in no more than 12.5% reduction in mottle, whereas a 33% mottle reduction was actually obtained.

EXAMPLE 2

Example 1 was repeated using varying levels of the same brightening agent in the phosphor layer as shown below. All other elements, conditions and test procedures were the same. The following results were obtained:

| Sample | Brightening Agent (Wt. % of Phosphor Layer) | Relative Screen Speed | Mottle |
|---|---|---|---|
| A | .01 | 100 | .024 |
| B | .05 | 98 | .020 |
| C | .20 | 91 | .019 |

[1]phosphor layer coated at 0.03 in (0.0762 cm.) wet thickness.

This example, like Example 1, demonstrates that increasing the level of brightening agent in the phosphor layer reduces the mottle considerably more than would have been expected from the teachings of Cleare et al.

EXAMPLE 3

In order to demonstrate that other brightening agents outside the aminocoumarin class will not function as described herein, Example 1 was repeated using Fluorescent Pigment No. 115 (a zinc oxide/magnesium oxide complex, American Phosphor Works, Toledo, Ohio) in the phosphor composition. In this case, films exposed to this screen had an exceedingly high level of mottle indicating the unsuitability of inorganic brighteners for the purposes of this invention, for example as X-ray screens.

The fluorescent screens of this invention are particularly useful for medical and industrial radiography. As illustrated in the Examples, the addition of aminocoumarin brightening agents to a phosphor which is extremely efficient in its own right produces a more significant reduction in quantum mottle than would have been expected, minimal adverse effect on screen speed and efficiency, and greatly improved X-ray images in the photographic films employed therewith.

We claim:

1. A luminescent composition comprising a mixture of a europium-activated barium fluorohalide phosphor and an aminocoumarin brightening agent in a binder.

2. The composition of claim 1 wherein the phosphor is $Ba_{.98}Eu_{.02}FCl$.

3. The composition of claim 1 wherein the aminocoumarin brightening agent has the formula

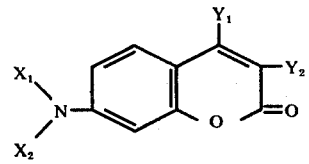

wherein each of $X_1$, $X_2$, $Y_1$, and $Y_2$ is hydrogen or alkyl.

4. An X-ray screen comprising a film support having the composition of claim 1 coated thereon.

5. An X-ray screen comprising a support bearing a thin layer of europium-activated Ba fluorohalide phosphor mixed with an aminocoumarin brightening agent and dispersed in a film-forming binder.

6. The X-ray screen of claim 5 wherein a reflective layer is interposed between the support and the phosphor layer.

7. The X-ray screen of claim 5 wherein a protective topcoat covers the phosphor layer.

8. The X-ray screen of claim 5 wherein a K or Rb salt is added to the phosphor in an amount sufficient to reduce lag.

9. An X-ray screen comprising a polyethylene terephthalate film support bearing in order (1) a reflective layer of $TiO_2$ and $K_2O (TiO_2)_6$, in a binder, (2) a thin layer of $Ba_{.98}Eu_{.02}FCl$ phosphor mixed with an aminocoumarin brightening agent in an amount up to 1% by wt. of the phosphor and dispersed in a binder, and (3) a protective topcoat.

10. The X-ray screen of claim 9 wherein the brightening agent is formed from the reaction of 3-phenyl-7-aminocoumarin and diethylamine in the presence of cyanuric chloride.

11. The X-ray screen of claim 9 wherein the protective topcoat is cellulose acetate.

12. A luminescent composition comprising a mixture of (1) a europium-activated barium fluorohalide phosphor of the formula $Ba_{1-(x+y)}Eu_xSr_yFQ$ wherein Q is Br, Cl, or I, x is 0.0001 to 0.2 and y is 0 to 0.8, the foregoing proportions being in molar amounts, and (2) an aminocoumarin brightening agent, in a binder.

* * * * *